(No Model.)
A. W. CHASE.
PROTRACTOR.
No. 601,630.
Patented Apr. 5, 1898.
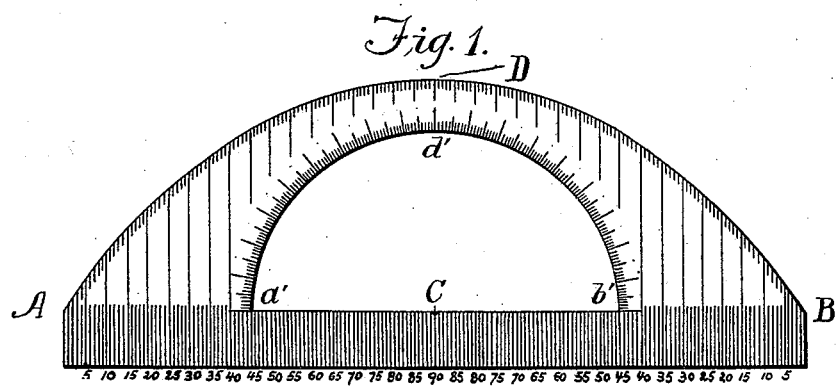
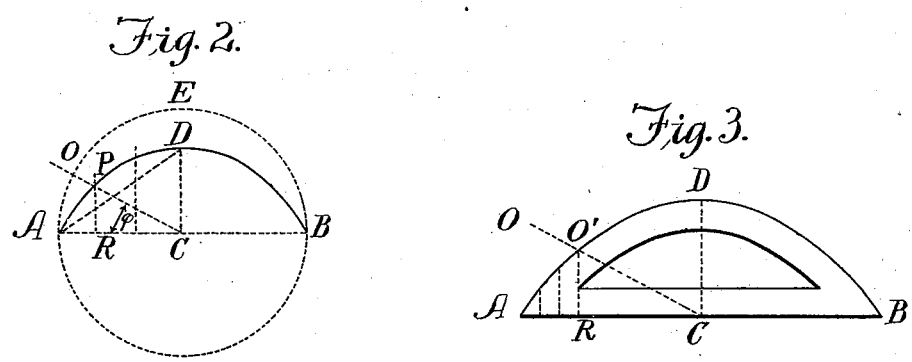
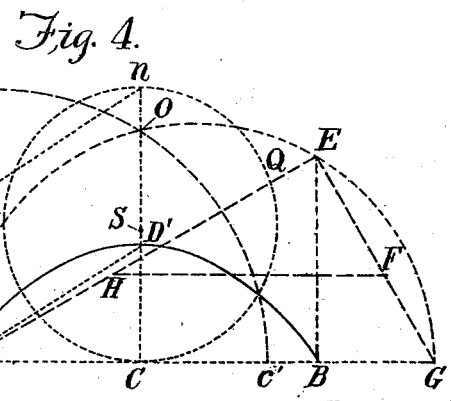
Witnesses:
C. L. Belcher
Wm. H. Capel
Inventor
Arthur W. Chase
By
H. C. Townsend
Attorney.

UNITED STATES PATENT OFFICE.

ARTHUR WALLACE CHASE, OF FORTRESS MONROE, VIRGINIA.

PROTRACTOR.

SPECIFICATION forming part of Letters Patent No. 601,630, dated April 5, 1898.

Application filed May 24, 1897. Serial No. 637,837. (No model.)

*To all whom it may concern:*

Be it known that I, ARTHUR WALLACE CHASE, a citizen of the United States, and a resident of Fortress Monroe, in the county of Elizabeth City and State of Virginia, have invented a certain new and useful Protractor, of which the following is a specification.

The object of my invention is to provide a protractor which can be used, among other things, for dividing a given angle into any number of equal angles; for accurately constructing a square equivalent in area to a circle of given diameter or, conversely, for constructing a circle equivalent in area to a given square; for constructing the cycloid for any given circle, and for other constructions and purposes, as will be apparent to mathematicians.

My invention consists, essentially, of a protractor having a curve or edge deduced from coördinating the diameter and the semicircumference of a circle, as hereinafter described.

In the accompanying drawings, Figure 1 is a plan of one form of my new protractor, the curve being shown of approximately the form required. Fig. 2 is a diagram explanatory of the manner of deducing the curve of the protractor. Figs. 3 and 4 are diagrams illustrating ways of using the instrument.

The curve on which the protractor is constructed may be deduced either by mechanically compounding the motion of two points or by construction or plotting, as follows:

Referring to Fig. 2, let A equal origin of curve or coördinate to be obtained, A D B equal curve for protractor, $a$ equal A C equal radius, C equal center of circle, A B equal diameter of circle, A E B equal semicircumference, A C O equal $\varphi$, A R equal $x$, and R P equal $y$. Let O and R start at the same time from A and both travel uniformly, O on semicircumference A, E, B, and R on diameter A B, so that O and R shall reach B at the same time.

Find the loci of the intersections of the varying radii vectores C O and the varying perpendiculars R O, passing, respectively, through the varying positions of O and R at simultaneous times. These intersections connected would form the curve A D B, which is the curve used in my protractor.

To plot the curve, $$\varphi : \pi :: x : 2\,a.$$

$$\varphi = \frac{\pi x}{2\,a},$$

and $$y = (x - a)\tan.\varphi = (x - a)\tan.\frac{\pi x}{2\,a},$$

from which value the curve may be plotted by erecting perpendiculars to the base A B.

Assuming a protractor accurately constructed, so that the edge or curve A D B follows the curve $Y = (x - a)\tan.\frac{\pi x}{2\,a}$, as deduced in the foregoing, the protractor may be used in the following and other ways:

First. To $n$-sect any angle. From the law of the curve equal arcs are described in equal times by O and corresponding equal distances in equal times by R. Let it be required to trisect A C O, Fig. 3. Place center of protractor at C, base coincident with A C, and note point R, where perpendicular from O' cuts A C, trisect A R and erect perpendiculars from points of division, join intersections of curve A D with C and one has the two radii vectores which trisect the angle A C O. For convenience in use of the instrument it is obvious that the edge or curve A D B may have graduations corresponding to the points of intersection by the perpendiculars erected at the various points of the equal divisions of the line A B, which is the diameter of the circle from which the curve is deduced and which conveniently may be assumed as divided into one hundred and eighty equal parts. Any other desired number of subdivisions of the curve might be employed and indicated thereon by suitable symbols, the reverse face of the instrument or the inner edge $a'\,d'\,b'$ being graduated to degrees of a semicircle to adapt it to be used in laying off angles in the ordinary way. The straight edges forming the base may have the usual zero and central marks and may also be graduated to equal parts.

Second. To construct a square equivalent in area to a given circle, let A D' B, Fig. 4, be the protractor, $m\,n\,$Q C be a circle for the area of which we wish to construct the equivalent square. Place the base of the protractor coincident with the tangent of the circle which is perpendicular to diameter C $n$. Lay off C $c'$ = C S (radius of circle) parallel to A D'. Draw $n$ A'. C A' will be the semibase of the cycloid constructed on circle $m$ $n$ Q C. On $$A'\ c' = A'\ C + C\ c' = \overline{C\ S}\ \pi + \overline{C\ S} = \pi\ r + r$$

as a diameter construct A' O $c'$. C O will be a side of the equivalent square, for C O is a mean proportional between A' C and C $c'$—i. e., $$\overline{C\ O}^2 = \pi\ r \times r = \pi\ r^2.$$

It is obvious that many other constructions could be made all depending on the same relation as established above.

Third. To construct a circle equivalent in area to a given square or equivalent in area to a given rectangle. In the latter case construct by well-known methods the equivalent square of the rectangle and proceed as follows: Let C O, Fig. 4, be a side of a square and let it be required to construct a circle equivalent in area. Place the protractor on a side of the square, so that its base coincides in direction with the side of the square and the line C D' in direction with another side of the square. Lay off B G = C D' and on A G construct the semicircumference A E G. Draw B E perpendicular to A G. Draw E A and E G. On E A lay off E H = C O and draw H F parallel to A G. Then will E F be the radius of the equivalent circle for $$A\ B : B\ G :: \overline{E\ H}^2 : \overline{E\ F}^2.$$

Since A B = $2\ a$ when (C D' = B G) = $\frac{2\ a}{\pi}$, we have $$2\ a : \frac{2\ a}{\pi} :: \overline{E\ H}^2 : \overline{E\ F}^2;$$

$$\therefore \overline{E\ H}^2 = \pi\ \overline{E\ F}^2 = \pi\ r^2,$$

or $$E\ F = r = \text{required radius}.$$

It is obvious that the reverse of this construction could be used to find the side of a square equivalent in area to a given circle.

That the cycloid of any circle can be constructed by the use of the protractor will be apparent from the following: Recurring to Fig. 2, $$y = (x - a)\ \tan. \frac{\pi\ x}{2\ a}.$$

To determine C D, the maximum ordinate, or $y$ when $x = a$: By substitution, $$C\ D = y\Big]_{x\ =\ a} = (x - a)\ \tan. \frac{\pi\ x}{2\ a}\Big]_{x\ =\ a} =$$
$$(a - a)\ \tan. \frac{\pi}{2} = \frac{(a - a)}{\cot. \frac{\pi}{2}} = \frac{0}{0}.$$

Now this seems indeterminate, but by evaluation we have $$y\Big]_{x\ =\ a} = (x - a)\ \tan. \frac{\pi\ x}{2\ a}\Big]_{x\ =\ a} = \frac{2\ a}{\pi};$$

$$\therefore C\ D = y = \frac{2\ a}{\pi},$$

or the ratio of A B to C D is $\pi$. This is a well-known relation which exists between certain lines in the cycloid. In a cycloid $$C\ D = 2\ a.$$
$$A\ C = \pi\ a;$$
$$\therefore \text{tangent angle } C\ A\ D = \frac{2\ a}{\pi\ a} = \frac{2}{\pi}.$$

In the curve above deduced $$\frac{C\ D}{A\ C} = \frac{2\ a}{\pi} \Big/ a = \frac{2}{\pi}.$$

Hence the tangent of the angle C A D is a constant common to all cycloids and to all of the curves of the class.

$$y = (x - a)\ \tan. \frac{\pi\ x}{2\ a}.$$

It will be evident on examination that the instrument possesses many other advantages, which will be apparent to those versed in geometry and the calculus.

By means of the degrees marked on the semicircumference $a'\ d'\ b'$, as shown in Fig. 1, as well as by the graduations of the outer curve when the semibase is divided by ninety verticals, the new protractor possesses all of the advantages of other protractors, whether semicircular or rectangular, designed for laying off accurately any desired number of degrees, &c.

What I claim as my invention is—

1. A protractor having the curve whose equation is $y = (x - a)\ \tan. \frac{\pi\ x}{2\ a}$, substantially as shown and for the purpose described.

2. A protractor having two curved plotting edges, one a semicircle and the other a curve whose equation is $y = (x - a)\ \tan. \frac{\pi\ x}{2\ a}$, as and for the purpose described.

3. An instrument designed for use as a protractor and for the multisection of angles, having for its exterior plotting edge the curve whose equation is $y = (x - a)\ \tan. \frac{\pi\ x}{2\ a}$, and for its interior plotting edge a semicircle, both curves having a common center, and both being graduated substantially as shown and described.

4. An instrument designed for the construction of the equivalent squares of given circles and conversely for the construction of the equivalent circles of given squares, having a plotting edge which at D in a line perpendicular to the base of the instrument, coincides with a point whose equation is $y = (x - a) \tan. \frac{\pi x}{2a}$, as and for the purpose described.

5. An instrument designed for the construction of cycloidal curves having an exterior edge constructed from the curve whose equation is $y = (x - a) \tan. \frac{\pi x}{2a}$, reference-line A B and point D and its face graduated, all substantially as shown and described.

6. In a drawing instrument, a frame-plate having a curved exterior edge, and a semicircular interior edge, the centers of these curves coincident, and a base-plate A, B, the base-line A, B, and the maximum vertical of the exterior curve of the frame-plate having the ratio $\frac{A B}{C D} = \pi$, and the face of the frame-plate being ruled and graduated, all substantially as shown and described.

Signed at Phoebus, in the county of Elizabeth City and State of Virginia, this 21st day of May, A. D. 1897.

ARTHUR WALLACE CHASE.

Witnesses:
JOHN H. CRONE,
SAMUEL SHIPLEY.